United States Patent [19]

Flexman

[11] Patent Number: 4,478,458
[45] Date of Patent: Oct. 23, 1984

[54] LOCKING AND ANTI-LOOSENING CONSTRUCTION FOR VEHICLE RIM

[75] Inventor: C. Hight Flexman, East Amherst, N.Y.

[73] Assignee: McGard, Inc., Buffalo, N.Y.

[21] Appl. No.: 438,589

[22] Filed: Nov. 2, 1982

[51] Int. Cl.$^3$ .............................................. B60B 27/00
[52] U.S. Cl. ................................ 301/9 SC; 301/9 SB; 301/9 DN; 301/37 SC; 301/37 SS
[58] Field of Search .............. 301/9 CN, 9 DN, 9 SC, 301/9 SB, 37 SC, 37 SS, 37 T

[56] References Cited

U.S. PATENT DOCUMENTS

| | | | |
|---|---|---|---|
| 1,037,733 | 9/1912 | Currin | 301/9 SB |
| 1,467,740 | 9/1923 | Thompson | 301/9 SB |
| 1,699,831 | 1/1929 | Braucher | 301/9 CN |
| 3,241,408 | 3/1966 | McCauley | 301/9 DN X |
| 3,425,760 | 2/1969 | Gordon | 301/9 CN |
| 4,346,940 | 8/1982 | Tatar | 301/37 AT |

FOREIGN PATENT DOCUMENTS 451557 4/1913 United Kingdom ............. 301/9 SC

*Primary Examiner*—David A. Scherbel
*Attorney, Agent, or Firm*—Joseph P. Gastel

[57] ABSTRACT

A rim mounting construction including a hollow hub mounting shaft having an apertured annular flange for mounting on rim mounting lugs, a spoked rim having a hub, interfitting splines on the hub and the hub mounting shaft, a hub securing nut having a shoulder for bearing against the hub and a threaded connection with the hub mounting shaft so that the shoulder will bear against the hub to retain it in position on the hub mounting shaft when the first threaded connection is tightened, a locking nut secured within the hub mounting shaft, and a locking bolt having a second threaded connection with the locking nut and having a head with a surface for bearing against the securing nut after the second threaded connection is tightened, the first and second threaded connections being of opposite hand whereby an attempted unthreading of the first threaded connection will result in a tightening of the second threaded connection to thereby prevent loosening of the securing nut, the head of the locking bolt having a curvilinear groove therein which can receive a mating curvilinear ridge on a key for loosening and tightening the locking bolt.

16 Claims, 9 Drawing Figures

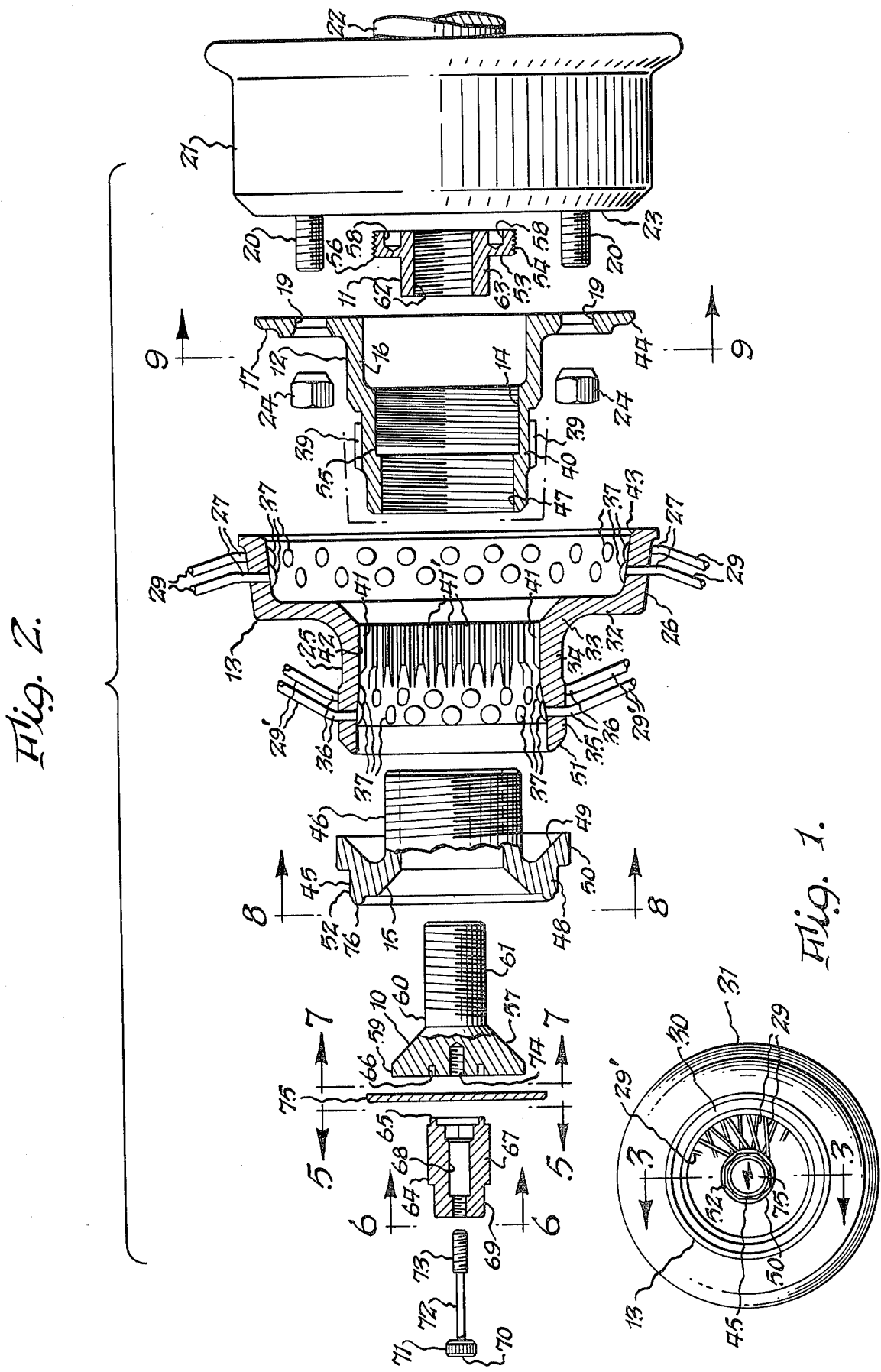

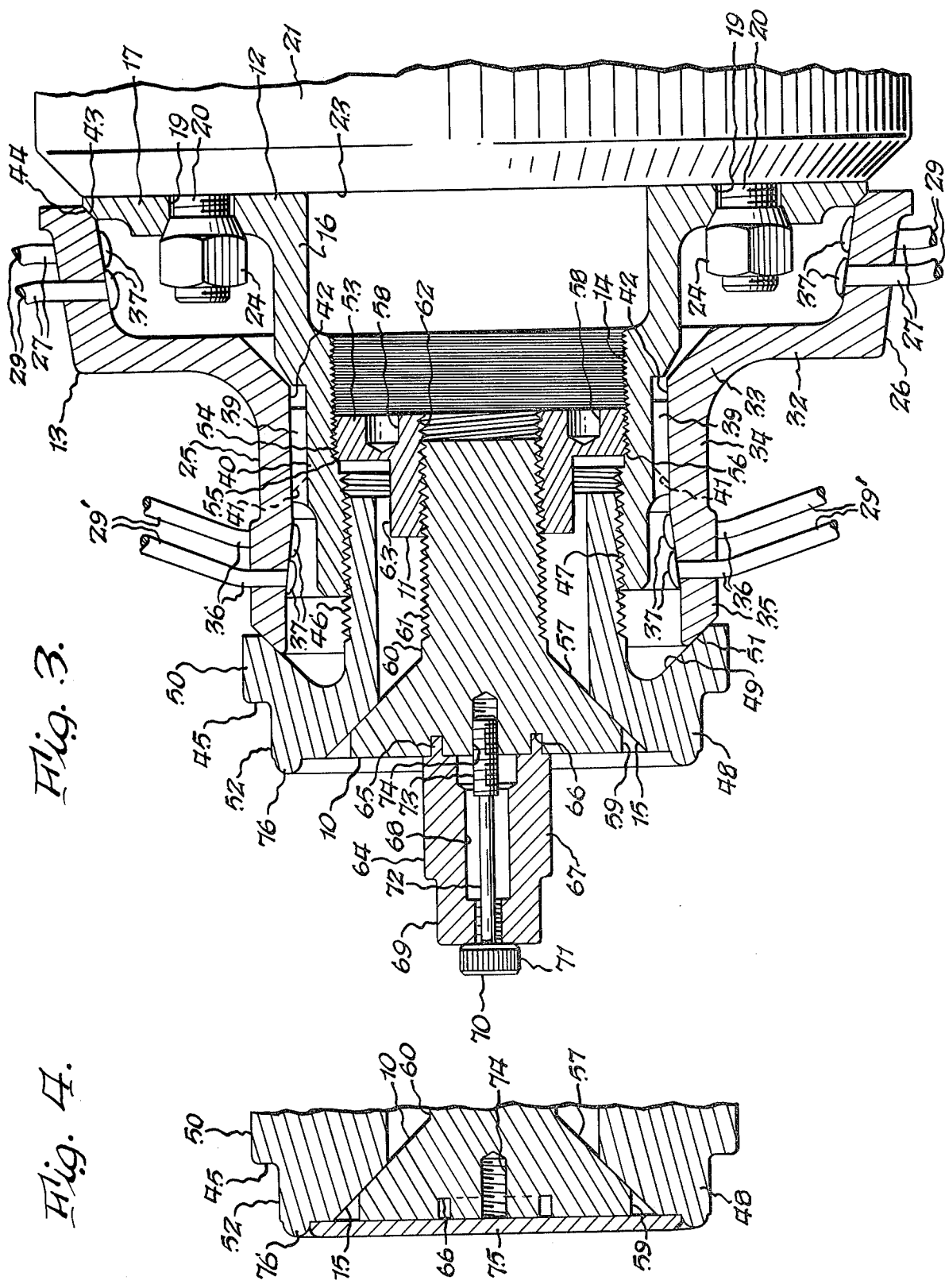

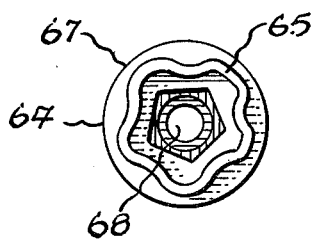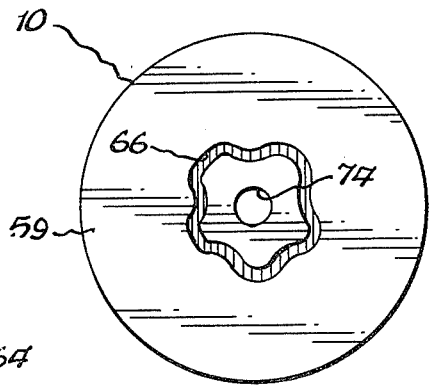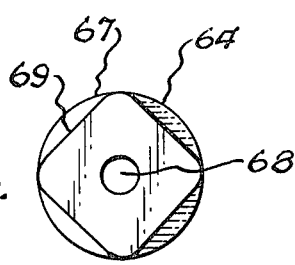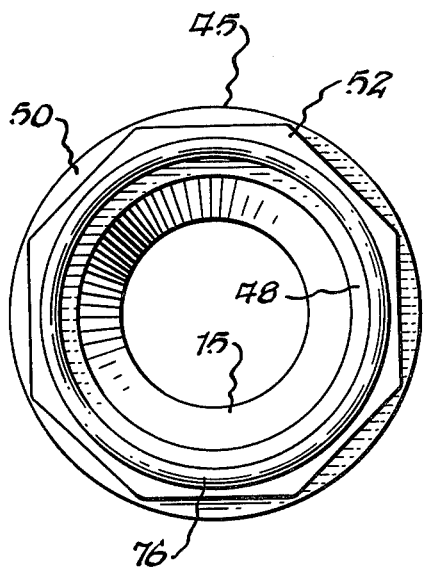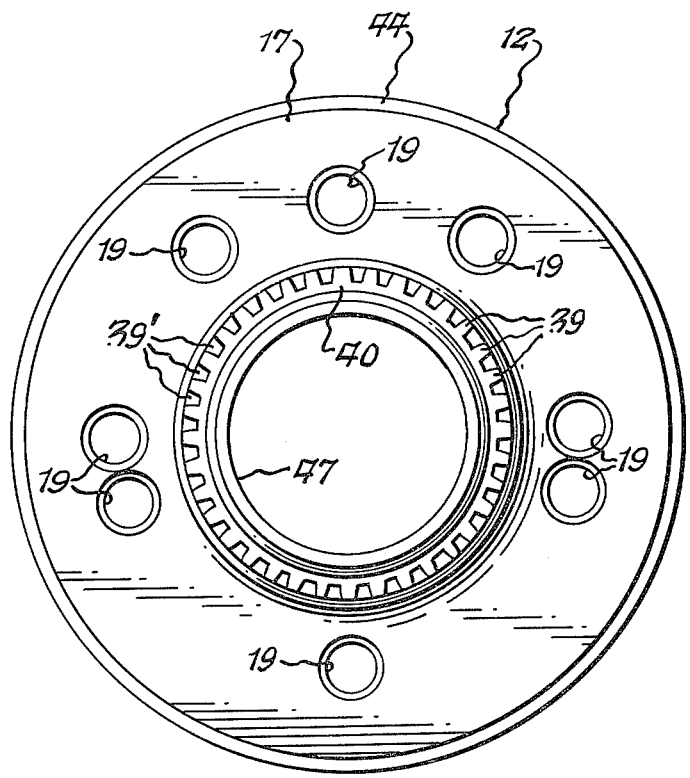

LOCKING AND ANTI-LOOSENING CONSTRUCTION FOR VEHICLE RIM

BACKGROUND OF THE INVENTION

The present invention relates to a construction for modifying an existing spoke rim mounting structure to prevent theft of the spoke rim and its mounting structure and also to prevent loosening of the spoke rim in use.

By way of background, there are in existence spoke rims and mounting constructions therefor for replacing standard rims on automotive vehicles. These prior constructions include a hub mounting shaft which is secured to the existing lugs on an axle, a spoked rim hub which fits onto the hub mounting shaft, and a securing nut which threads onto the hub mounting shaft and secures the hub in mounted position on the hub mounting shaft. With constructions of this type there was no way of locking the hub securing nut against removal which in turn permitted the rim and the hub mounting shaft to be stolen. In addition, the hub securing nut frequently loosened in operation and had to be retightened. It is with overcoming the foregoing deficienicies of prior spoke rim mounting structures that the present invention is concerned.

SUMMARY OF THE INVENTION

It is the object of the present invention to provide a modification to the existing wire spoke rim mounting structure which locks the rim securing nut against unauthorized removal and loosening. A related object of the present invention is to provide an improved rim mounting construction wherein the existing parts are modified slightly and relatively few additional parts are added to thereby achieve protection against unauthorized removal and loosening in an extremely economical and effective manner. Other objects and attendant advantages of the present invention will readily be perceived hereafter.

The present invention relates to an improvement in a rim mounting construction having a hub mounting shaft with an internal surface, attachment means on said hub mounting shaft for mounting said hub mounting shaft on rim mounting lugs of an axle, a rim having a hub for mounting on said hub mounting shaft, a hub securing member, a shoulder on said hub securing member, and first thread means between said hub securing member and said hub mounting shaft for attaching said hub securing member to said hub mounting shaft with said shoulder bearing against said hub to thereby secure said hub on said hub mounting shaft, the improvement comprising a locking nut, securing means for securing said locking nut within said internal surface of said hub mounting shaft, a locking bolt having a shank and a bolt head, second thread means for securing said shank in mating engagement with said locking nut, first and second surfaces on said bolt head and said hub securing member, respectively, for frictional abutting engagement after said shank has been tightened with said locking nut, said first and second thread means being of opposite hand whereby an attempted unthreading of said first thread means will result in a tightening of said second thread means to thereby prevent loosening of said hub securing member. The various aspects of the present invention will be more fully understood when the following portions of the specification are read in conjunction with the accompanying drawings wherein:

BRIEF DESCRIPTION OF THE DRAWINGS

FIG. 1 is a side elevational view of a wire spoke rim mounting an automotive tire and having the improved locking construction of the present invention;

FIG. 2 is a fragmentary exploded cross sectional view taken substantially along line 3—3 of FIG. 1 and adding the locking key;

FIG. 3 is an enlarged fragmentary cross sectional view taken substantially along line 3—3 of FIG. 1 and showing the rim hub in mounted relationship on its supporting structure, with the locking structure of the present invention in locking condition and additionally showing the locking key attached to the locking bolt, the latter being absent from FIG. 1;

FIG. 4 is a fragmentary cross sectional view taken substantially along line 3—3 of FIG. 1 and showing the cover plate in position on the rim securing nut and obscuring the head of the locking bolt;

FIG. 5 is a view taken substantially in the direction of arrows 5—5 of FIG. 2 and showing the ridge on the face of the key which is used to turn the locking bolt;

FIG. 6 is a view taken in the direction of arrows 6—6 of FIG. 2 and showing the head of the key which receives a wrench;

FIG. 7 is a view taken in the direction of arrows 7—7 of FIG. 2 and showing the head of the locking bolt which contains a curvilinear groove which is of a mating configuration to receive the ridge of the key of FIG. 5;

FIG. 8 is a view taken in the direction of arrows 8—8 of FIG. 2 and showing the face of the securing nut which secures the hub of the rim on its supporting structure; and FIG. 9 is a view taken in the direction of arrows 9—9 of FIG. 2 and showing an end view of the hub mounting shaft.

DESCRIPTION OF THE PREFERRED EMBODIMENTS

Summarizing briefly in advance, the improved locking construction of the present invention comprises a locking bolt 10 and a locking nut 11 which have been added to a preexisting wire spoke rim mounting structure. The locking nut has been inserted into a hub mounting shaft which mounts the hub of the wire spoke rim 13. The hub mounting shaft has been altered, in accordance with the present invention, by the addition of tapped portion 14 to receive the locking nut. Also, the rim securing nut 45 has been altered by the forming of the frustoconical surface 15 to receive the frustoconical head of the locking bolt 10. The preexisting wire spoke rim and its mounting structure, as described immediately hereafter, form no part of the present invention, except for the addition of the locking structure which will be described at an appropriate portion of this specification.

As mentioned briefly above, certain automobile owners wish to replace the conventional tire rims with wire spoke rims. To effect such a conversion, a hollow hub mounting shaft 12 is provided which includes a stepped hollow generally cylindrical portion 16 which terminates at annular flange 17 having a plurality of bores 19 for mounting on the studs 20 secured to the vehicle axle 22 and which protrude from the brake drum 21 surrounding the vehicle axle. Flange 17 is secured against the face 23 of drum 21 by means of a plurality of nuts 24 which are normally used to secure the conventional tire rim. Nuts 24 are assembled on threaded studs 20, as shown in FIG. 3.

The wire spoke rim 13 includes a hub 25 having an outer generally frustoconical annular portion 26 to which the inner ends 27 of certain of the spokes 29 are anchored, the outer ends being suitably anchored to the outer rim portion 30 on which tire 31 is mounted. Hub portion 26 merges into annular portion 32 which, in turn, merges into curved annular portion 33 which merges into substantially cylindrical portion 34 which, in turn, terminates at cylindrical portion 35 to which the inner ends 36 of other spokes 29' are anchored. The outer ends of spokes 29' are anchored in outer rim portion 30. The anchoring of the spokes 29 and 29' is by means of upsetting their ends at 37.

The hub mounting shaft 12 includes a plurality of splines 39 separated by spaces 39' (FIGS. 2 and 9) on cylindrical portion 40 thereof. Splines 39 are placed in mating engagement with splines 41 separated by spaces 41' on the internal surface 42 of portion 34 of hub 13, so that when hub 13 is in mounted position on hub mounting shaft 12, splines 39 and 41 are in meshing engagement so that the hub 13 and the hub mounting shaft 12 are keyed for rotary motion.

After hub 13 has been axially slid onto hub mounting shaft 12 so that it assumes the position shown in FIG. 3 with annular surface 43 of hub 13 bearing against annular surface 44 of flange 17, a hub securing member 45 in the form of a nut has its threaded portion 46 threaded into tapped portion 47 of hub mounting shaft 12 until surface 49 of shoulder 50 bears against mating annular surface 51 of portion 35 of hub 13. For facilitating the tightening, the hub securing member 45 has an octagonal head 52 which can be tightened with a wrench.

The immediately preceding portions of the specification have described preexisting known structure for mounting a wire spoked rim 13 onto a hub mounting shaft 12 and securing it in position by means of a hub securing member 45 in the form of a nut.

In the past wire spoked rims have been stolen by merely unscrewing nut 45, pulling the hub 13 and its associated rim off of hub mounting shaft 12 and thereafter removing nuts 24 to detach hub mounting shaft 12. This was not only a loss to the automobile owner, but it was a factor which limited growth of this particular segment of the industry because automobile owners were reluctant to purchase wire spoked rims because of the ease with which they were stolen. In addition, the use of a single nut, such as 45, for retaining rim 13 in mounted position frequently resulted in the rim becoming loose The following described modification of the existing wire spoked rim structure described above overcomes the foregoing two deficiencies. These modifications are relatively simple and can be adapted to the above described existing structure. In the foregoing respect, a nut 11 is provided having an enlarged annular portion 53 with a threaded outer surface 54 which threads into tapped bore 14 of hub mounting shaft 12 which terminates at shoulder 55. At this point it is to be noted that tapped portion 14 was added to hub mounting shaft 12, which originally did not contain this structure, and that the purpose of providing tapped portion 14 was to receive locking nut 11 in mating relationship. Preferably locking nut 11 is threaded all of the way into tapped bore 14 until edge 56 engages shoulder 55. The threading may be effected by applying a spanner wrench to diametrically opposed bores 58 in cylindrical portion 53. An anaerobic locking compound may be applied between tapped portion 14 and threads 54 so as to retain locking nut 11 in permanent locked relationship. While the securing arrangement of member 11 has been shown as a threaded connection, it will be appreciated that any other connection may be provided which will retain locking nut 11 in position. At this point it is to be noted that threads 54 and mating tapped portion 14 are right-handed threads.

The existing wire spoked rim structure is further modified by machining an internal frustoconical surface 15 on securing nut 45. A locking nut 10 is added to the existing structure. Locking nut 10 has an external frustoconical surface 57 on its head 59. A shank 60 extends from head 59 and shank 60 has a left-handed thread 61 which is received in mating left-handed tapped bore 62 which extends through cylindrical portion 63 and portion 53 of locking nut 11.

Locking bolt 10 is tightened to the position shown in FIG. 3 wherein frustoconical surfaces 15 and 57 are in tight frictional engagement. As noted above, threads 61 are left-handed. The threads 46 on securing nut 45 are right-handed. Thus, after locking bolt 10 has been tightened, if an attempt is made to loosen securing nut 45 by turning it in a counterclockwise direction in FIG. 1, the frictional engagement between the head of locking bolt 10 and surface 15 of securing member 45 will tend to cause the bolt 10 to turn in a counterclockwise direction which will tend to cause locking bolt 10 to tighten because it has left-handed threads. Therefore, when locking bolt 10 is in tight frictional engagement with securing nut 45 at frustoconical surfaces 15-57, any attempted loosening of securing nut 45 will be successfully opposed by locking bolt 10.

In accordance with a further aspect of the present invention, the head 59 of locking bolt 10 is recessed within the frustoconical depression within the head 48 of securing nut 5. Therefore, a wrench cannot be used to turn bolt 10 in a clockwise direction to remove it from locking nut 11 so that securing nut 45 can thereafter be removed. At this point it is to be noted that head 59 is of specially hardened steel so that it cannot be chiseled or otherwise marred to provide a footing for a turning tool.

Locking bolt 10 can only be tightened and loosened by the use of a special key 64 having an endless curvilinear ridge 65 (FIG. 5) which fits into mating engagement with endless curvilinear groove 66 in the head 59 of locking bolt 10. This ridge and groove structure is fully described in U.S. Pat. No. 3,241,408, which is incorporated herein by reference. Briefly, however, it can be seen that a tool other than a key 64 cannot be inserted into curvilinear groove 66 to loosen bolt 10 because any such tool would tend to slip and therefore could not provide the required torque. It can further be seen that infinite numbers of variations in the shape of ridge 65 and 66 can be made so that a key of a first set of a mating ridge and groove will not fit a groove of a second set which varies from the first set in an extremely minor manner.

The key 64 includes a cylindrical body portion 67 which terminates at a square head 69 which receives a wrench for turning key 64. However, in view of the fact that the ridge 65 and groove 66 are relatively shallow, a screw 70, having a head 71 and a shank 72, extend axially through the bore 68 in body 67 and square head 69, and the threaded end 73 of shank 72 is received in tapped bore 74 of locking nut head 59. Thus, when screw 71 is tightened, ridge 65 will be firmly seated in groove 66 and when a wrench is applied to square head 69, ridge 65 will not slip out of groove 66. After locking nut 10 has been tightened by the use of key 64, knurled head 71 is manipulated to unscrew threaded end 73 from tapped bore 74 whereupon the key 64 may be removed, leaving the head 59 bare, as shown in FIG. 4. Thereafter, a disc 75 (FIG. 4) can be snapped into the recess provided by annular shoulder 76 of securing nut 45 to cover locking bolt head 59.

It can thus be seen that the existing mounting construction for a wire spoke rim has been modified by the addition of a tapped portion 14 to the hub mounting shaft, the insertion of a locking nut 11 in threaded engagement with the tapped portion, the forming of a internal frustoconical surface 15 on the hub securing nut, and the provision of a locking bolt 10 which is threaded into the locking nut with a threaded connection which is of opposite hand to the existing threaded connection between the securing nut 45 and the hub mounting shaft 12, with the locking bolt having a curvilinear groove 66 therein for turning by a key having a mating curvilinear ridge 65, to thereby achieve the above enumerated objects of preventing theft of the rim and its mounting shaft and also preventing loosening of the rim on its mounting shaft because the locking bolt cannot be removed without the use of a special key.

While the above description has disclosed a construction wherein the left-handed threads 61-62 are used to absolutely positively lock right-handed threads 46-47 against loosening, it will be appreciated that if threads 61-62 were also right-handed and if the locking bolt 10 was screwed in tightly, the structure would also be locked against removal because locking bolt 10 would prevent securing member 45 from being unscrewed, especially if the threads between the locking bolt and its nut extended at a pitch angle relative to the threads between the securing nut and the hub mounting shaft so that there was binding of the threads when an attempt was made to turn securing member 45. The binding would occur if turning of securing member 45 caused bolt 10 to unscrew at a slower axial rate than securing member 45. Accordingly, while the disclosed embodiment showing the left-handed threads working against right-handed threads is preferred, it will be appreciated that threads of the same hand on both the securing member 45 and on the locking bolt 10 would prevent unauthorized loosening and removal of the securing member 45.

In addition to the foregoing, while the head 59 of locking bolt 10 has been shown with a conical surface for mating engagement with conical surface 15, it will be appreciated that the present invention need not necessarily be limited thereto, as bolt 10 can be made with a surface of any configuration which will frictionally engage a mating surface on the securing nut 45. In this respect, it may be desired to provide a counterbore in head 48 for receiving a mating surface on a modified form of locking bolt 10 which has a mating surface which extends perpendicularly to the longitudinal axis of the bolt 10. In addition, it may be desired, in certain circumstances, to have the head of the locking bolt 10 protruding outwardly, rather than being recessed within a counterbore or countersunk hole in the head 48. In a structure of this type, the protruding outer surface of the head may be frustoconical or otherwise curved in such a manner so that it cannot be gripped by a wrench for loosening and so that the only way that it can be loosened is by the use of a key, such as 64, cooperating with a curvilinear groove in the head.

While the foregoing description has referred to a wire spoke rim, it will be appreciated that the present invention is not limited thereto.

While preferred embodiments of the present invention have been disclosed, it will be appreciated that the present invention is not limited thereto, but may be otherwise embodied within the scope of the following claims.

What is claimed is:

1. In a rim mounting construction having a hub mounting shaft with an internal surface, attachment means on said hub mounting shaft for mounting said hub mounting shaft on rim mounting lugs of an axle, a rim having a hub for mounting on said hub mounting shaft, a hub securing member, a shoulder on said hub securing member, and first thread means between said hub securing member and said hub mounting shaft for attaching said hub securing member to said hub mounting shaft with said shoulder bearing against said hub to thereby secure said hub on said hub mounting shaft, the improvement comprising a locking nut, securing means for securing said locking nut within said internal surface of said hub mounting shaft, a locking bolt having a shank and a bolt head, first and second surfaces on said bolt head and said hub securing member, respectively, and second thread means between said shank and said locking nut for drawing said first surface into frictional abutting engagement with said second surface after said first thread means have been tightened to cause said shoulder to bear against said hub and for preventing said hub securing member from being unthreaded from said hub at said first thread means.

2. In a rim mounting construction as set forth in claim 1 wherein said first and second thread means are of opposite hand whereby an attempted unthreading of said first thread means will result in a tightening of said second thread means.

3. In a rim mounting construction as set forth in claim 2 wherein said first and second surfaces comprise a male frustoconical surface on said locking bolt and a female frustoconical surface on said hub securing member.

4. In a rim mounting construction as set forth in claim 3 wherein said bolt head is recessed within said securing member, a curvilinear groove in said bolt head, and a key having a curvilinear ridge for mating engagement with said curvilinear groove, whereby said key can turn said locking bolt in a first direction for withdrawing said locking bolt from said locking nut and in a second direction for locking said hub securing member and said hub sleeve together.

5. In a rim mounting construction as set forth in claim 2 including a curvilinear groove in said bolt head, and a key having a curvilinear ridge for mating engagement with said curvilinear groove, whereby said key can turn said locking bolt for withdrawing said locking bolt from said locking nut and for locking said hub securing member and said hub sleeve together.

6. In a rim mounting construction as set forth in claim 5 wherein said bolt head is substantially recessed within said securing member.

7. In a rim mounting construction as set forth in claim 2 wherein said securing means comprise interengaging threads.

8. In a rim mounting construction as set forth in claim 7 wherein said interengaging threads comprise a tapped bore in said hub mounting shaft located between said first thread means and said attachment means of said hub mounting shaft, and a threaded outer portion on said locking nut.

9. In a rim mounting construction as set forth in claim 8 including a second shoulder within said hub mounting shaft between said first thread means and said tapped bore, and a third shoulder on said locking nut for engaging said second shoulder.

10. In a rim mounting construction as set forth in claim 1 wherein said first and second surfaces comprise a male frustoconical surface on said locking bolt and a female frustoconical surface on said hub securing member.

11. In a rim mounting construction as set forth in claim 10 wherein said bolt head is recessed within said securing member, a curvilinear groove in said bolt head, and a key having a curvilinear ridge for mating engagement with said curvilinear groove, whereby said key can turn said locking bolt in a first direction for withdrawing said locking bolt from said locking nut and in a second direction for locking said hub securing member and said hub sleeve together.

12. In a rim mounting construction as set forth in claim 1 including a curvilinear groove in said bolt head, and a key having a curvilinear ridge for mating engagement with said curvilinear groove, whereby said key can turn said locking bolt for withdrawing said locking bolt from said locking nut and for locking said hub securing member and said hub sleeve together.

13. In a rim mounting construction as set forth in claim 12 wherein said bolt head is substantially recessed within said securing member.

14. In a rim mounting construction as set forth in claim 1 wherein said securing means comprise interengaging threads.

15. In a rim mounting construction as set forth in claim 14 wherein said interengaging threads comprise a tapped bore in said hub mounting shaft located between said first thread means and said attachment means of said hub mounting shaft, and a threaded outer portion on said locking nut.

16. In a rim mounting construction as set forth in claim 15 including a second shoulder within said hub mounting shaft between said first thread means and said tapped bore, and a third shoulder on said locking nut for engaging said second shoulder.

* * * * *